United States Patent
Shioiri et al.

(10) Patent No.: US 9,841,068 B2
(45) Date of Patent: Dec. 12, 2017

(54) FIXATION STRUCTURE FOR SELECTABLE ONE-WAY CLUTCH

(71) Applicant: TOYOTA JIDOSHA KABUSHIKI KAISHA, Toyota-shi, Aichi (JP)

(72) Inventors: Hiroyuki Shioiri, Yokohama (JP); Hideaki Komada, Gotemba (JP); Hiroyuki Shibata, Odawara (JP); Yuki Kurosaki, Susono (JP); Hiroki Yasui, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/062,784

(22) Filed: Mar. 7, 2016

(65) Prior Publication Data

US 2016/0265606 A1 Sep. 15, 2016

(30) Foreign Application Priority Data

Mar. 10, 2015 (JP) .................. 2015-046858

(51) Int. Cl.
*F16D 41/14* (2006.01)
*F16D 41/12* (2006.01)

(52) U.S. Cl.
CPC ........... *F16D 41/14* (2013.01); *F16D 41/125* (2013.01)

(58) Field of Classification Search
CPC ......... F16D 41/12; F16D 41/14; F16D 41/125
See application file for complete search history.

(56) References Cited

U.S. PATENT DOCUMENTS

| | | | | |
|---|---|---|---|---|
| 4,646,890 A * | 3/1987 | Yamada | .................... | F16D 3/02 192/207 |
| 5,979,627 A * | 11/1999 | Ruth | ....................... | F16D 13/64 192/209 |
| 6,575,275 B2 * | 6/2003 | Muramatsu | ............. | F16D 41/12 192/212 |
| 7,896,144 B2 * | 3/2011 | Brees | ....................... | F16D 3/66 192/212 |
| 8,083,042 B2 * | 12/2011 | Samie | ................... | F16D 41/125 192/43.1 |

FOREIGN PATENT DOCUMENTS

JP 6-10232 U 2/1994
JP 6-10232 Y2 3/1994

* cited by examiner

*Primary Examiner* — Richard Lorence
(74) *Attorney, Agent, or Firm* — Andrews Kurth Kenyon LLP

(57) ABSTRACT

A fixation structure for a selectable one-way clutch is provided. The fixation structure comprises: a stationary member in which the pocket plate is held coaxially; a projection formed on the pocket plate protruding radially outwardly; a spline groove formed in the stationary member to which the projection is inserted while keeping a predetermined clearance in a circumferential direction; and an elastic member that is interposed between the projection and the spline groove to push the projection in a direction that the strut held in an upper side of the pocket is moved toward the notch.

2 Claims, 4 Drawing Sheets

FIXATION STRUCTURE FOR SELECTABLE ONE-WAY CLUTCH

The present invention claims the benefit of Japanese Patent Application No. 2015-046858 filed on Mar. 10, 2015 with the Japanese Patent Office, the disclosure of which is incorporated herein by reference in its entirety.

BACKGROUND

Field of the Invention

Preferred example relates to the art of a selectable one-way clutch adapted to selectively enable a torque transmission only in one direction and to interrupt torque transmission in both directions, and especially to a fixation structure for selectable one-way clutch.

Discussion of the Related Art

One example of the selectable one-way clutch is described in JP-U-6-10232. According to the teachings of JP-U-6-10232, the one-way clutch is fixed to a housing by engaging spline ridges on an outer race of the one-way clutch with spline grooves on an inner face of the housing.

The one-way clutch is selectively brought into engagement depending on a direction of torque applied thereto. However, an engagement or disengagement of the one-way clutch should be delayed inevitably by rotating the one-way clutch within an end play between the spline ridge and the spline groove. Specifically, the selectable one-way clutch is brought into a torque transmittable condition by bringing a strut held in one of rotary plates into engagement with a notch formed on the other rotary plate opposed thereto through an aperture formed on a selector plate (or a slide plate) interposed between those plates. In the selectable one-way clutch of this kind, the strut may be displaced from the aperture due to end play between the spline ridge and the spline groove to cause an engagement delay of the selectable one-way clutch or uneven contact between the strut and the notch.

SUMMARY OF THE INVENTION

Aspects of preferred example has been conceived noting the foregoing technical problems, and it is therefore an object of the preferred embodiment is to provide a fixation structure for a selectable one-way clutch configured to prevent an imperfect engagement or an engagement delay due to end play in a spline.

Preferred example relates to a fixation structure for a selectable one-way clutch, comprising: a pocket plate having a plurality of pockets holding struts while allowing to project from the pocket arranged symmetrically across a center point; a notch plate that has a plurality of notches to which a leading end of each the strut is individually brought into engagement, and that is opposed to the pocket plate in a rotatable manner; a selector plate having a plurality of apertures for letting through the struts that is interposed between the pocket plate and the notch plate while being allowed to rotate therebetween. In order to achieve the above-explained objective, according to the preferred example, the fixation structure is provided with: a stationary member in which the pocket plate is held coaxially; a projection formed on the pocket plate protruding radially outwardly; a spline groove formed in the stationary member to which the projection is inserted while keeping a predetermined clearance in a circumferential direction; and an elastic member that is interposed between the projection and the spline groove to push the projection in a direction that the strut held in an upper side of the pocket plate is moved toward the notch.

In the fixation structure, at least two projections are formed on the pocket plate symmetrically across the center point of the pocket plate, and each of the projections is individually provided with the elastic member. In addition, the elastic members push the projections in opposite directions in the circumferential direction around the center point of the pocket plate.

Alternatively, the elastic members may also be arranged in such a manner to push the projections in same directions in the circumferential direction around the center point of the pocket plate.

In the selectable one-way clutch according to the preferred example, the upper strut is brought into engagement with the notch of the notch plate earlier than the lower strut, and hence the lower strut is withdrawn in the rotational direction of the notch plate by a torque of the notch plate. Consequently, a clearance is created between the leading end of the lower strut and the notch so that the lower strut can be pushed into the notch even if the lower strut is delayed to be pushed up by a viscosity of the oil remaining in the lower section of the selectable one-way clutch.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
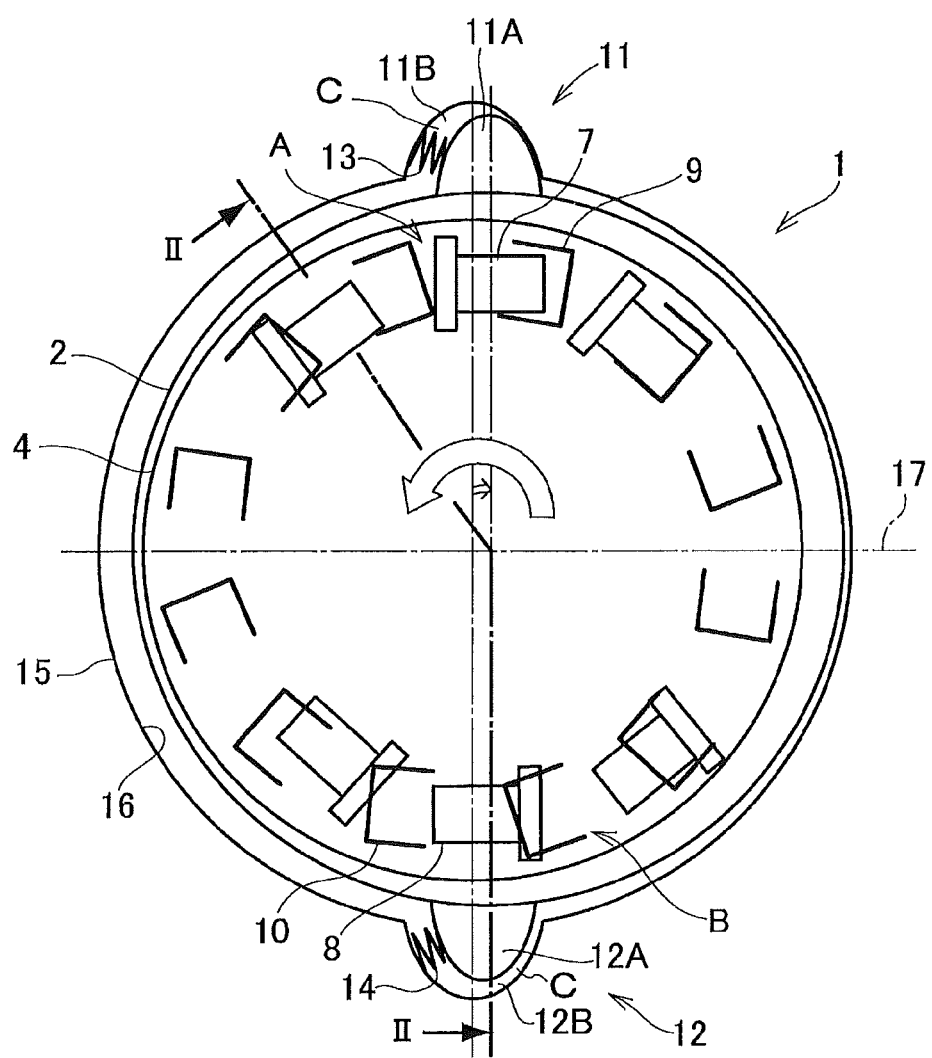
FIG. 1 is a schematic illustration of the fixation structure of the selectable one-way clutch according to the preferred example.
Figure 2:
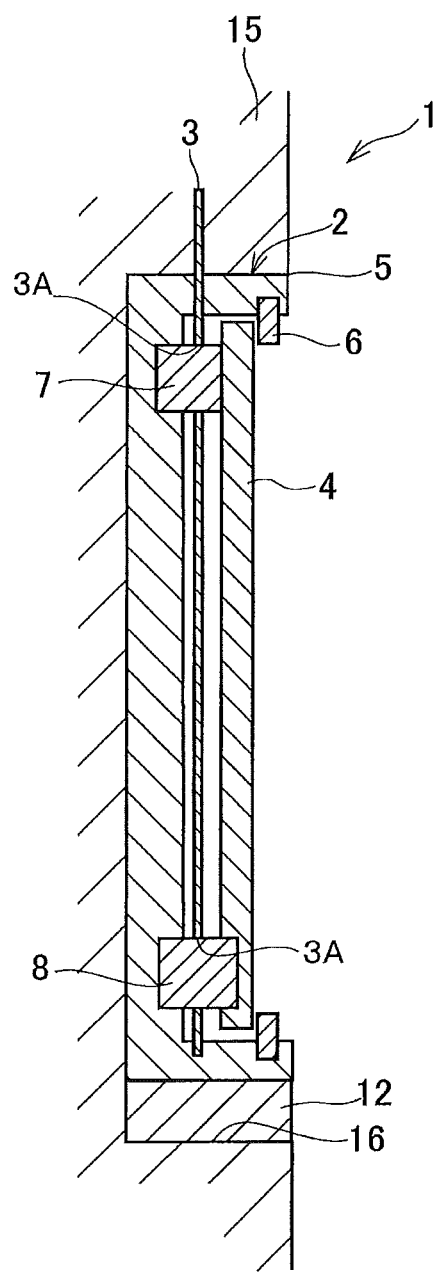
FIG. 2 is an enlarged cross-sectional view showing a cross-section of the fixation structure of the selectable one-way clutch according to the preferred example along II-II line shown in FIG. 1.

A preferred example of the fixation structure for a selectable one-way clutch (to be abbreviated as the "SOWC" hereinafter") 1 will now be explained with reference to the accompanying drawings. FIG. 1 shows the fixation structure for the SOWC 1 according to the preferred example, and FIG. 2 shows a cross-section of the fixation structure along II-II line in FIG. 1. Specifically, a lower half of FIG. 2 shows a situation in which a below-mentioned strut 8 is brought into engagement with a below-mentioned notch 10, and an upper half of FIG. 2 shows a situation in which the strut 8 is brought into engagement with the notch 10. A fundamental structure of the SOWC 1 is similar to those of the conventional SOWCs taught e.g., by JP-A-2014-526658 etc. As illustrated in FIG. 2, the SOWC 1 comprises a pocket plate 2, a selector plate 3 and a notch plate 4.

Specifically, the pocket plate 2 is an annular plate member having a short cylinder 5 in its outer circumference. The selector plate 3 and the notch plate 4 are held in the pocket plate 2 in the order shown in FIG. 2, and a snap ring 6 is fitted onto an inner circumference of the cylinder 5 to close the pocket plate 2. That is, the pocket plate 2 and the notch plate 4 are opposed to each other, and the selector plate 3 is interposed therebetween while being allowed to rotate. As illustrated in FIG. 1, projections 11A and 12A individually serving as a spline ridge are formed on an outer circumference of the pocket plate 2 symmetrically across a rotational center, and spline grooves 11B and 12B are formed in a casing 15 as a stationary member. The projections 11A and 12A are individually splined to the spline grooves 11B and 12B while keeping a clearance C therebetween in a circumferential direction. In order to fill the clearance C, an elastic member 13 is interposed between an outer face of the projection 11A and an inner face of the spline groove 11B so that the projection 11A is pushed by the elastic member 13 in a direction along a tangential line of the pocket plate 2. Likewise, an elastic member 14 is interposed between an outer face of the projection 12A and an inner face of the spline groove 12B so that the projection 12A is pushed by the elastic member 14 in the direction along the tangential line of the pocket plate 2.

A plurality of pockets as depressions are formed on a face of the pocket plate 2 facing to the notch plate 4 in a circular manner while keeping predetermined intervals, and a strut is held in each pocket in a pivotal manner. In the example shown in FIG. 1, the struts are divided into a group A and a group B, and the struts belongs to the group A will be called the strut 7, and the struts belongs to the group B will be called the strut 8. Specifically, each of the struts 7 is situated symmetrically with each of the struts 8 across a center of the pocket plate 2. Specifically, each strut 7, 8 is individually shaped into a rectangular piece, and allowed to pivot around one of longitudinal ends thereof as a fulcrum to protrude other end (as will be called the "leading end" hereinafter) toward the notch plate 4, and to withdraw the other end into the pocket of the pocket plate 2. In the lower half of FIG. 2, there is shown a situation in which the leading end of lower strut 8 is elastically pushed up by a spring (not shown) disposed between each of the strut and a bottom of the pocket of the pocket plate 2. By contrast, in the upper half of FIG. 2, there is shown a situation in which the upper strut 7 is pushed into the pocket of the pocket plate 2 by the selector plate 3 against the spring.

A plurality of apertures (i.e., through holes) 3A are also formed on the selector plate 3 at radially same level as the pockets of the pocket plate 2 and in the same number as the pockets and the struts. The notch plate 4 is also an annular plate member, and a plurality of notches 9, 10 are formed on a face of the notch plate 4 facing to the pocket plate 2 at radially same level and in the same number as the pockets of the pocket plate 2 and struts.

Specifically, as shown in the lower half of FIG. 2, when the selector plate 3 is rotated in the pocket plate 2 to a position at which the lower aperture 3A is overlapped with the pocket of the pocket plate 2, the leading end of the lower strut 8 is allowed to be pushed up by the spring toward the lower notch 10 of the notch plate 4 through the lower aperture 3A. By contrast, when the selector plate 3 is rotated in the pocket plate 2 to a position at which the upper aperture 3A is displaced from the pocket of the pocket plate 2, the leading end of the upper strut 7 is pushed into the pocket of the pocket plate 2 by an edge of the upper aperture 3A as shown in the upper half of FIG. 2. When the leading end of the strut 7 (8) is pushed into the notch 9 (10) through the aperture 3A, the leading end of the strut 9 (10) is brought into abutment to an inner wall of the notch 9 (10) as an engagement wall.

As described, the projections 11A and 12A of the pocket plate 2 are individually pushed by the elastic member 13 so that the pocket plate 2 is displaced together with the notch plate 4 rightward in FIG. 1. Consequently, center axes of the pocket plate 2 and the notch plate 4 are displaced from a center axis of a bore 16 of the casing 15. However, since the selector plate 3 is connected to an after-mentioned actuator (not shown) to be rotated in a circumferential direction, the selector plate 3 is allowed to stay at a position where a center axis thereof aligns with the center axis of the bore 16 of the casing 15. In the SOWC 1 thus structured, therefore, a clearance between the leading end of the strut 7 situated closest to the projection 11A and the engagement wall of the notch 9 is narrowed, but a clearance between the leading end of the strut 8 situated closest to the projection 12A and the engagement wall of the notch 10 is widened. That is, the leading end of the strut 7 situated closest to the projection 11A is brought into engagement with the engagement wall of the notch 9 to transmit torque therebetween by rotating the selector plate 3 counterclockwise in FIG. 1, earlier than the leading end of the strut 8 situated closest to the projection 12A to be brought into engagement with the engagement wall of the notch 10.

Figure 3A:
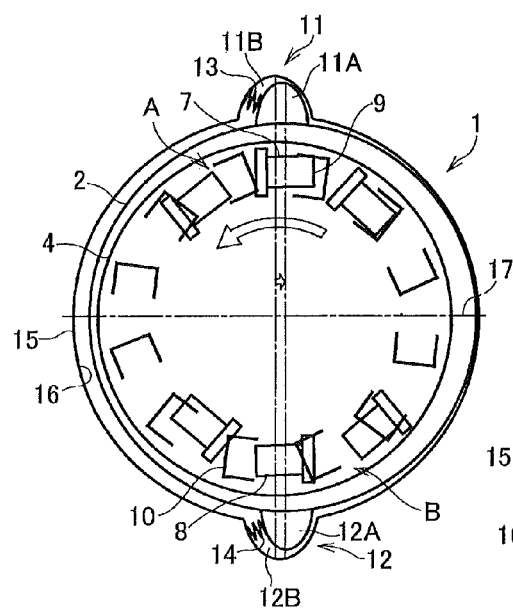
FIG. 3(a) to FIG. 3(d) are schematic illustrations showing a procedure to bring the selectable one-way clutch into engagement.

Turning to FIG. 3(a) to FIG. 3(d), there is shown an action of the SOWC 1 to be brought into engagement mode to enable torque transmission therethrough. First of all, as illustrated in FIG. 3(a), the selector plate 3 is rotated counterclockwise to the position at which the aperture 3A are individually overlapped with the pockets of the pocket plate 2 holding the struts 7 and 8 therein by the actuator such as an electromagnetic actuator and a hydraulic actuator.

When the selector plate 3 is rotated to the position at which the apertures 3A are overlapped with the pockets of the pocket plate 2, each of the strut 7 and 8 is individually allowed to be pushed into each of the notch 9 and 10. In this situation, however, the lower strut 8 may be delayed to be pushed up by a viscosity of lubrication oil remaining in a lower portion of the SOWC 1.

Figure 3B:
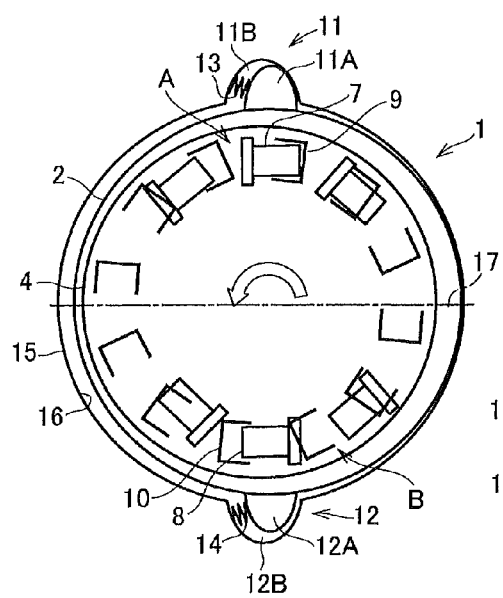
Figure 3C:
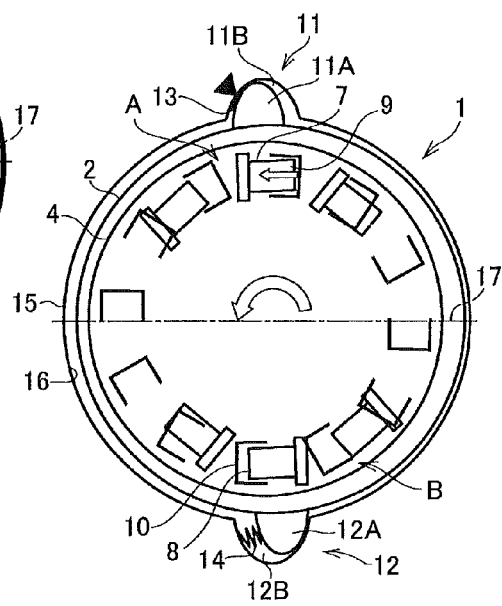
Figure 3D:
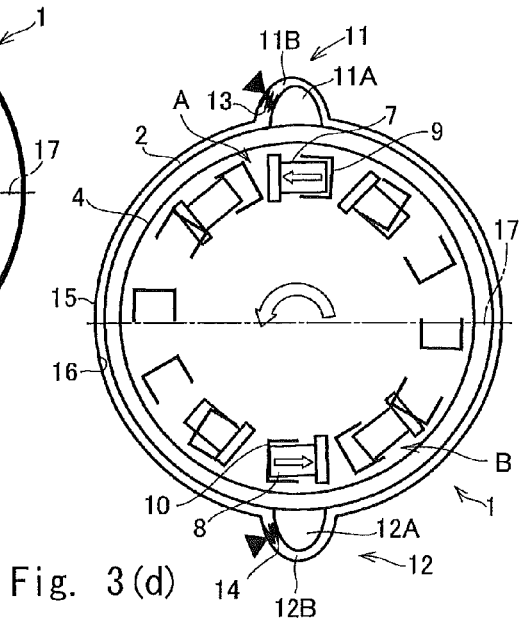

However, the pocket plate 2 is pushed by the elastic members 13 rightward in FIG. 1 to narrow the clearance between the leading end of the strut 7 situated closest to the projection 11A and the engagement wall of the notch 9. For this reason, the strut 7 is allowed to be brought into abutment to the engagement wall of the notch 9 immediately in this situation to enable torque transmission therebetween. By contrast, the clearance between the leading end of the strut 8 situated closest to the projection 12A and the engagement wall of the notch 10 is widened as illustrated in FIG. 3(b), and hence the leading end of the strut 8 has not yet been brought into abutment to the engagement wall of the notch 10 when the leading end of the strut 7 comes into contact to the engagement wall of the notch 9. As a result of such engagement of the strut 7 with the notch 9, torque acting counterclockwise is applied to the pocket plate 2 and hence the pocket plate 2 is rotated counterclockwise while compressing the elastic member 13 interposed between the projection 11A and the spline groove 11B as illustrated in FIG. 3(c). Consequently, the clearance between the leading end of the strut 8 situated closest to the projection 12A and the engagement wall of the notch 10 is narrowed. Eventually, as illustrated in FIG. 3(d), the leading end of the strut 8 is brought into abutment to the engagement wall of the notch 10 to enable torque transmission therebetween. Consequently, the center axes of the pocket plate 2 and the notch plate 4 are aligned with the center axis of the selector plate 3 to dissolve eccentricity of the pocket plate 2 and the notch plate 4 from the bore 16 of the casing 15.

According to the preferred example, therefore, it is possible to secure required time for bringing the lower strut 8 into engagement with the lower notch 10 even if the lower strut 8 is delayed to be pushed up. For this reason, an imperfect engagement of the lower strut 8 can be prevented to limit damage on the SOWC 1. In addition, since the eccentricity of the pocket plate 2 and the notch plate 4 from the bore 16 of the casing 15 is dissolved, damage on the rotary members such as gears may also be limited.

Further, rattling noise and engagement noise resulting from contact between the engagement walls of the notches and the leading end of the struts may be suppressed by the elastic members 13 and 14.

Figure 4A:
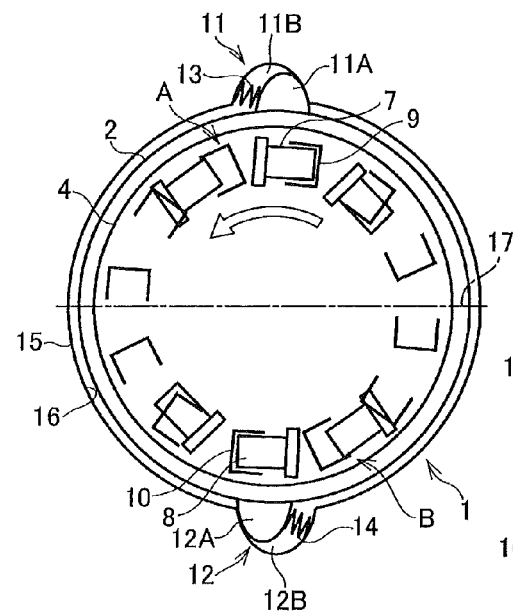
FIG. 4(a) to FIG. 4(d) are schematic illustrations showing an action of the selectable one-way clutch in which a position of the elastic member is altered.

Next, another example of the SOWC 1 in which a position of the elastic member 14 is altered will be explained with reference to FIG. 4(a) to FIG. 4(d). According to another example, as illustrated in FIG. 4(a), the elastic member 14 is interposed between the outer face of the projection 12A and the inner face of the spline groove 12B in an opposite side of the elastic member 13 across a diametrical line between spline grooves 11B and 12B passing the through the center of the bore 16 of the casing. That is, according to the example shown in FIG. 4(a) to FIG. 4(d), the elastic members 13 and 14 are arranged in such a manner to rotate the pocket plate clockwise, and hence the pocket plate 2 is kept to be aligned coaxially with the notch plate 4.

Figure 4B:
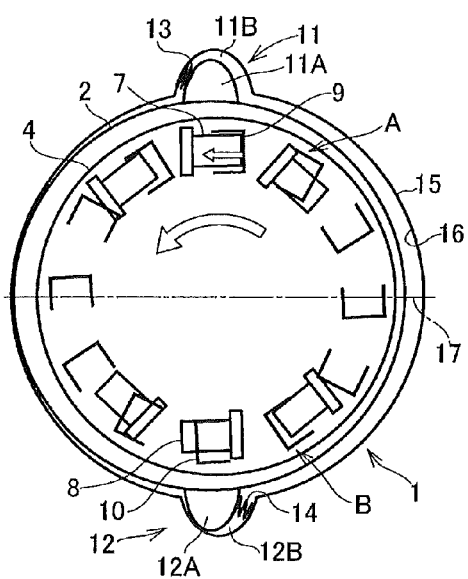
Figure 4C:
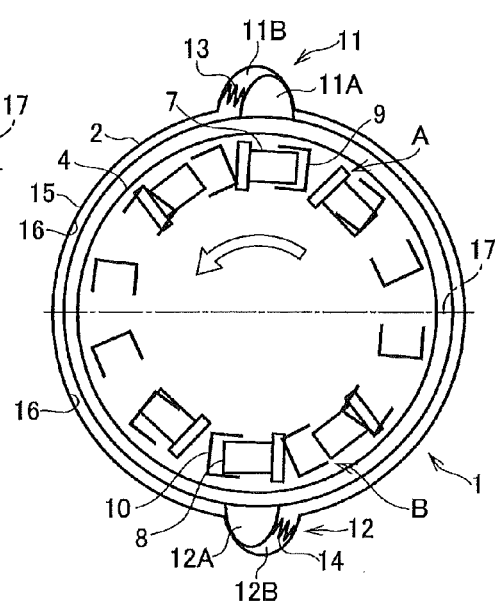
Figure 4D:
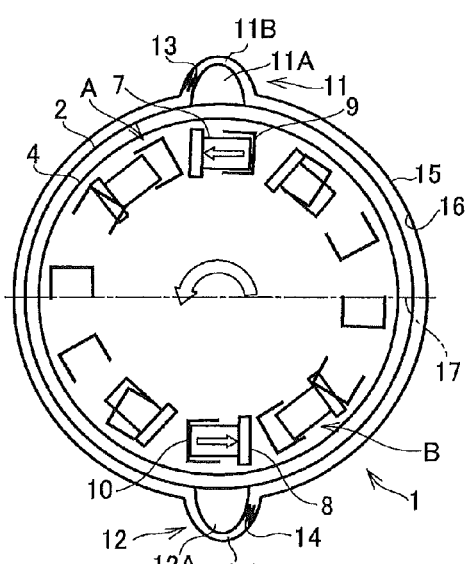

In the situation shown in FIG. 4(b), the notch plate 4 is rotated counterclockwise so that the pocket plate 2 is pushed leftward in FIG. 4(b) in the bore 16 of the casing 15. In this situation, the leading end of the upper strut 7 has already been brought into abutment to the engagement wall of the notch 9 and hence the elastic member 13 is compressed by the projection 11A. By contrast, the leading end of the lower strut 8 has not yet been brought into contact to the engagement wall of the notch 10 by the viscosity of the oil remaining the lower side of the SOWC 1. In this situation, therefore, the pocket plate 2 is displaced leftward in the bore 16 of the casing 15 but the selector plate 3 remains coaxial with the casing 15, and hence the leading end of the lower strut 8 is pushed downwardly by the edge of the aperture 3A of the selector plate 3. Consequently, the projection 12A is still pushed by the elastic member 14 to be kept into contact to the inner face of the spline groove 12B. Then, as shown in FIG. 4(c) the projection 11A is pushed again to be isolated away from the inner wall of the spline groove 11B by the elastic force of the elastic member 13 derived from repulsive force established by an impact to compress the elastic member 13 to the maximum extent. Consequently, a clearance is created between the leading end of the lower strut 8 and the engagement wall of the notch 10 by the repulsive force of the notch plate 4 so that the leading end of the lower strut 8 is allowed to be pushed into the notch 10. As a result, in the SOWC 1, both of the upper strut 7 and the lower strut 8 are brought into engagement with the notches 9 and 10.

In the SOWC 1 shown in FIG. 1, therefore, minimum required time can be ensured to bring the lower strut 8 into engagement with the notch 10 by such repetition of collision and isolation of the notch plate 4 to/from the casing 15. That is, all of the struts 7 and 8 can be brought into engagement with the notches 9 and 10 homogeneously even if the lower strut 8 is delayed to be pushed up by the viscosity of the oil remaining in the lower section of the SOWC 1. For this reason, damage on the SOWC 1 can be limited, and rattling noise and engagement noise can be suppressed by the elastic members 13 and 14.

Lastly, it will be apparent to those skilled in the art that various modifications and variations may be made to the disclosed selectable one-way clutch within the spirit of the present invention. For example, positions of the elastic members may be altered arbitrarily depending on a position of the strut that is delayed to be pushed up. In addition, number of the elastic members may be increased to limit the damage on the selectable one-way clutch more effectively.

What is claimed is:

1. A fixation structure for a selectable one-way clutch, comprising:
   a casing having a bore;
   a pocket plate located in the bore of the casing having a plurality of pockets holding struts while allowing to project from the pocket arranged symmetrically across a center point;
   a notch plate that has a plurality of notches to which a leading end of each of the strut is individually brought into engagement, and that is opposed to the pocket plate in a rotatable manner;
   a selector plate having a plurality of apertures for letting through the struts that is interposed between the pocket plate and the notch plate while being allowed to rotate therebetween;
   a stationary member in which the pocket plate is held coaxially;
   a projection formed on the pocket plate protruding radially outwardly;
   a spline groove formed in the stationary member to which the projection is inserted while keeping a predetermined clearance in a circumferential direction; and
   an elastic member that is interposed between the projection and the spline groove to push the projection in a direction that a center axis of the pocket plate is misaligned with a center axis of the bore of the casing, and that the strut held in an upper side of the pocket plate is moved toward the notch.

2. The fixation structure for a selectable one-way clutch as claimed in claim 1,
   wherein at least two projections are formed on the pocket plate symmetrically across the center point of the pocket plate,
   wherein each of the projections is individually provided with the elastic member, and
   wherein the elastic members push the projections in opposite directions in the circumferential direction around the center point of the pocket plate.

* * * * *